United States Patent [19]

Smith

[11] Patent Number: 5,092,434
[45] Date of Patent: Mar. 3, 1992

[54] CONTROL STRATEGIES FOR A DUAL RANGE INFINITELY VARIABLE TRANSMISSION

[75] Inventor: Morley S. Smith, Freeville, N.Y.

[73] Assignee: Borg-Warner Automotive, Inc, Sterling Heights, Mich.

[21] Appl. No.: 648,010

[22] Filed: Jan. 30, 1991

[51] Int. Cl.$^5$ ............................................. B60K 41/28
[52] U.S. Cl. ..................... 192/0.032; 192/0.055; 192/0.09; 192/0.094
[58] Field of Search ............... 192/0.034, 0.055, 0.062, 192/0.09, 0.094, 0.032; 74/857; 180/197

[56] References Cited

U.S. PATENT DOCUMENTS

| | | | |
|---|---|---|---|
| 4,291,594 | 9/1981 | Baudoin | 192/0.09 X |
| 4,397,379 | 8/1983 | Baudoin | 192/0.032 |
| 4,466,521 | 8/1984 | Hattori et al. | 192/0.032 |
| 4,478,322 | 10/1984 | Carlson et al. | 192/0.094 X |
| 4,700,590 | 10/1987 | Omitsu | 74/857 |
| 4,750,598 | 6/1988 | Danno et al. | 192/0.09 |
| 4,782,934 | 11/1988 | Takano | 192/0.032 X |
| 4,793,454 | 12/1988 | Petzold et al. | 192/0.032 |
| 4,803,628 | 2/1989 | Hayashi et al. | 192/0.032 X |
| 4,846,321 | 7/1989 | Ohkumo | 192/21.5 X |
| 4,905,801 | 3/1990 | Tezuka | 192/0.032 |
| 4,990,127 | 2/1991 | Roberts et al. | 475/211 |
| 5,020,622 | 6/1991 | Hrovat | 180/197 |

*Primary Examiner*—Rodney H. Bonck
*Attorney, Agent, or Firm*—Hugh A. Abrams, Esq.; Greg Dziegielewski, Esq.

[57] ABSTRACT

A control strategy for obtaining optimal acceleration of a vehicle containing a dual range infinitely variable transmission. The transmission output clutch is selectively engaged in order to provide an optimal distribution of power during acceleration of a vehicle between accelerating the vehicle and accelerating the engine speed in order to obtain a higher power output from the engine.

5 Claims, 9 Drawing Sheets

CONTROL STRATEGIES FOR A DUAL RANGE INFINITELY VARIABLE TRANSMISSION

Reference is made to the subject matter of U.S. Pat. No. 4,990,127, soon to be issued to Richard W. Roberts et al., for a "Dual Range Infinitely Variable Transmission." The present invention is a new control strategy for transmissions of that type.

BACKGROUND OF THE INVENTION

1. Field of the Invention

The present invention relates to a dual range infinitely variable transmission and, more particularly, to a control strategy for an infinitely variable transmission which includes two power paths to a pair of planetary gearsets. The transmission utilizes a continuously variable speed mechanism in conjunction with a fixed ratio speed mechanism for the two power paths. A two-position jaw clutch means is utilized to switch between the single path high range and the dual path low range of the transmission. A reaction type clutch is utilized to lock the sun gear of the second planetary gear set to provide a positive neutral.

2. Description of the Prior Art

The typical continuously variable transmission (CVT) employs a continuously variable speed mechanism in the form of a variable pulley with a pair of flanges mounted on an input shaft such that at least one of the flanges is movable axially with respect to the other. A similar variable pulley is mounted on an output shaft. A flexible belt couples the pulleys to allow the transfer of torque between the shafts when one of the shafts is driven. When the pitch radius of one pulley is changed, the pitch radius of the other pulley is changed simultaneously in the opposite direction. As a result, the drive ratio between the input and output shafts is varied in a continuous, smooth manner within the ratio range of the speed mechanism.

Heretofore, efforts have been made to extend the range of the transmission drive ratio of a continuously variable transmission (CVT) beyond the ratio range of the variable speed mechanism, that is, to devise an infinitely variable transmission. One such effort utilized two power paths between the torque input source and the rotating output. One power path comprised the conventional variable speed mechanism described above with variable pulleys on the input and output shafts and a belt connecting the pulleys. The second power path comprised a pair of sprockets, one located on each of the input and output shafts, and a silent chain drivingly connecting the two sprockets. The silent chain drive provided a fixed ratio drive.

In general, an engine's output power is affected by the speed at which it is cycling. This relation between engine speed and output power is particularly evident in the gas turbine engine whose output power displays an approximate linear relation to the speed at which the turbine spins. An infinitely variable transmission (IVT) allows an engine to maintain a constant speed, and thus constant power output, as a vehicle's speed changes. As the speed of the vehicle changes, the transmission ratio adjusts to maintain essentially a constant engine speed and output power.

In light of the advantages proVided by a dual range infinitely variable transmission, and more particularly the benefits in using an IVT in conjunction with a gas turbine engine, it is desirable to have a control strategy for simultaneously accelerating a vehicle in response to a driver's demand and accelerating the engine in order to obtain the desired output power. At least two factors influence the determination of how to allocate the limited available engine power between accelerating the vehicle and accelerating the engine. First, it takes a finite period of time to increase the engine speed to a desired higher power speed due to the rotational inertia of the spinning engine parts. This problem is particularly evident in gas turbine engines whose rotating parts exhibit large moments of inertia. Furthermore, this period increases as more engine power is used for the purpose of accelerating the vehicle. Thus, allocating power to accelerating the vehicle decreases the rate at which higher power output is reached. Second, higher power output is not desirable if the torque supplied for turning the wheels exceeds the traction capabilities of the wheels and causes the wheels to lose traction with the driving surface. It is therefore desirable for the infinitely variable transmission to be controlled in such a manner as to balance the above factors in order to obtain a desirable acceleration rate.

OBJECTS OF THE INVENTION

It is therefore an object of this invention to provide a strategy for providing control of acceleration in a vehicle containing an infinitely variable transmission.

It is a another object of this invention to provide a control strategy for allocating the finite power produced by an engine between accelerating the engine speed in order to enhance the power output and accelerating the vehicle.

Other objects, advantages and features of the present invention will become apparent upon reading the following detailed description and appended claims, and upon reference to the accompanying drawings.

SUMMARY OF THE INVENTION

Control strategies for accelerating a vehicle containing an infinitely variable transmission are proposed for implementation in conjunction with the infinitely variable transmission. These strategies are particularly valuable in the control of a dual range infinitely variable transmission coupled to a gas turbine engine, however, they would be suitable for use in any vehicle utilizing an infinitely variable transmission.

The first acceleration control strategy delays engagement of the transmission output clutch until the engine has reached peak power output speed. After the engine has attained peak power speed, then the clutch is engaged to deliver power to the transmission output shaft and accelerate the vehicle while maintaining the peak power engine speed.

The second acceleration control strategy assumes that the engine output power exceeds the maximum power that may be delivered to the drive train without losing traction. The transmission output clutch is engaged to the extent that the torque delivered to the wheels to accelerate the car does not exceed the traction limit of the wheels. The excess power is used to accelerate the engine.

The third acceleration control strategy initially substantially disengages the transmission output clutch and substantially all of the engine's power is used to accelerate the engine to a desired speed. The operator signals the transmission controller when the desired engine speed has been obtained. The transmission output clutch used to selectively couple the input and output shafts of the vehicle is engaged in order to accelerate the vehicle. The transmission controller modifies the continuously variable transmission ratio in order to decelerate the engine and the power released in decelerating the engine is transferred to the transmission output in order to accelerate the vehicle.

In accordance with one embodiment of this invention, an infinitely variable transmission apparatus is provided to couple a torque input source to a torque output. The transmission includes rotatable input and output shafts, as well as a rotatable intermediate shaft. First and second planetary gearsets are provided with each gearset having a first portion or planetary carrier portion, a second portion or sun portion and a third portion or ring portion.

Dual power paths are provided within the transmission. A first path allows selective driving coupling at a predetermined, fixed ratio of the input shaft with the carrier portion of the first planetary gearset. One power path includes a plurality of sprocket members and a power transmission chain, or silent chain, coupling the sprocket members. A first sprocket is positioned around the input shaft while a second sprocket is positioned around the carrier portion of the first planetary gearset. Alternately, an idler gear assembly, or the like, can be utilized to provide a fixed ratio drive in the first power path.

A jaw clutch means is slidingly connected around the first carrier to allow driving coupling of the carrier with the output sprocket of the silent chain constituting the first path, or, alternatively, locked coupling of the carrier to the ring portion of the first planetary gearset, thus decoupling the first path. The jaw clutch, with a detent ring, provides a spring-actuated toggle device with two distinct equilibrium positions. The equilibrium positions are mutually exclusive, that is, it is impossible for the clutch to be in both equilibrium positions simultaneously.

The other power path allows a second driving coupling of the input shaft with the intermediate shaft. This second power path includes an continuously variable speed mechanism having a first variable pitch pulley rotatable with the input shaft, a second variable pitch pulley rotatable with the intermediate shaft, and a belt coupling the pulleys. The intermediate shaft is drivingly coupled to the sun portion of the first planetary gearset. Unlike the first power path, the second power path cannot be disconnected by the control means.

The second planetary gearset of the transmission is located adjacent the first planetary gearset in the power path. The ring portion of the second planetary gearset is also the ring portion of the first planetary gearset. The carrier portion of the second planetary gearset is operatively coupled to the rotatable output shaft of the transmission.

A multiple plate clutch, or reaction type clutch, is connected to the sun portion of the second planetary gearset. The multiple plate clutch is operative to selectively ground the sun portion. In addition to overload protection and true neutral capabilities, the reaction type clutch includes the capability to slip at prescribed and controlled torque levels. The clutch acts to provide 100% slip, with a drag sufficient to eliminate backlash when the vehicle is stationary, and limits circulating power in the transmission to prevent belt or chain tensile overload.

BRIEF DESCRIPTION OF THE DRAWINGS

For a more complete understanding of this invention, one should refer to the preferred embodiment illustrated in greater detail in the accompanying drawings and described below by way of an example of the invention. In the drawings.

DETAILED DESCRIPTION OF THE DRAWINGS

Reference is again made to the subject matter of soon to issue U.S. Pat. No. 4,990,127, from which a description of the dual range infinitely variable transmission is taken.

Figure 1:
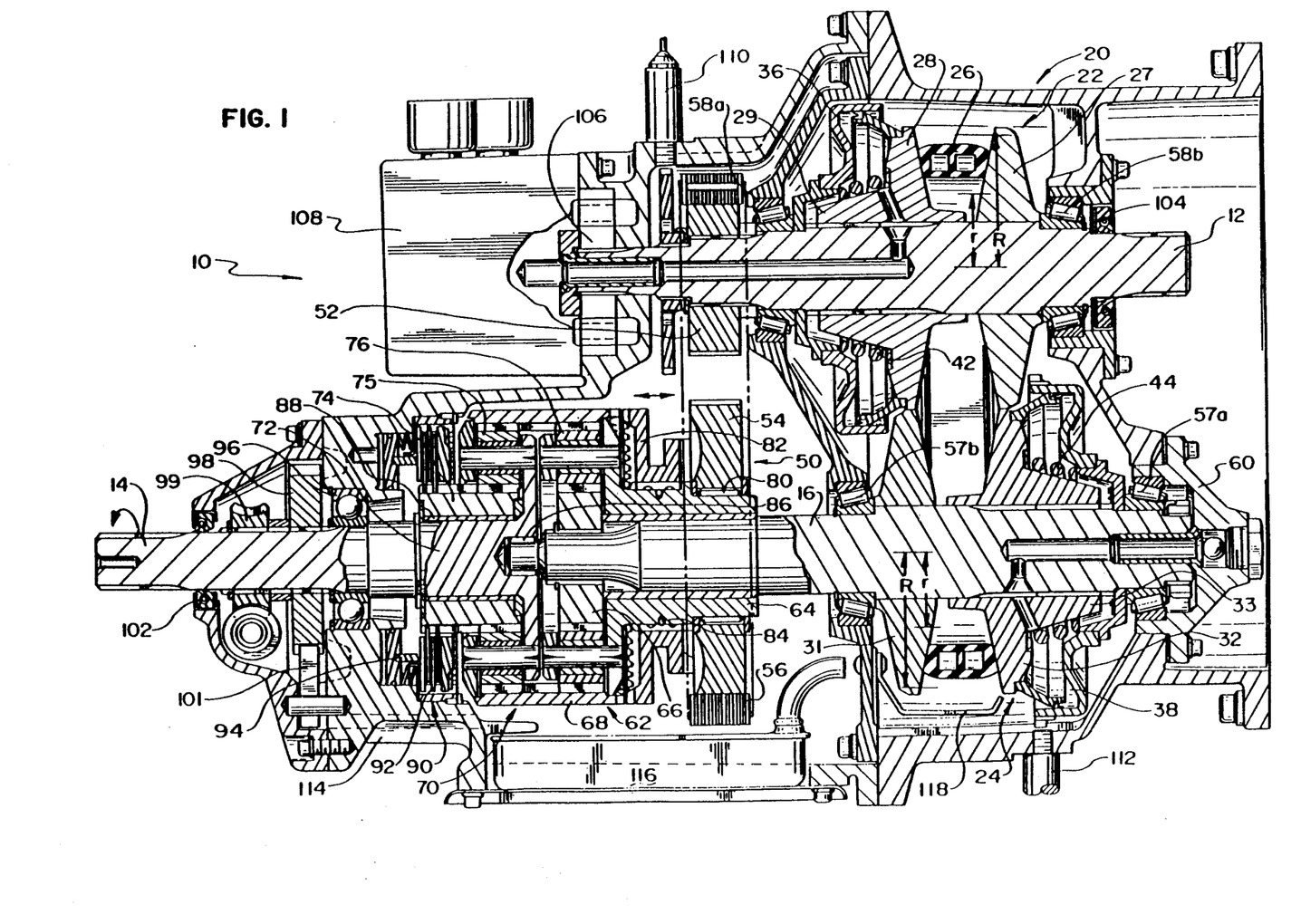
FIG. 1 is a longitudinal sectional view of the infinitely variable transmission utilized with the control strategies of the present invention and illustrating the locations of the internal components.
Figure 2:
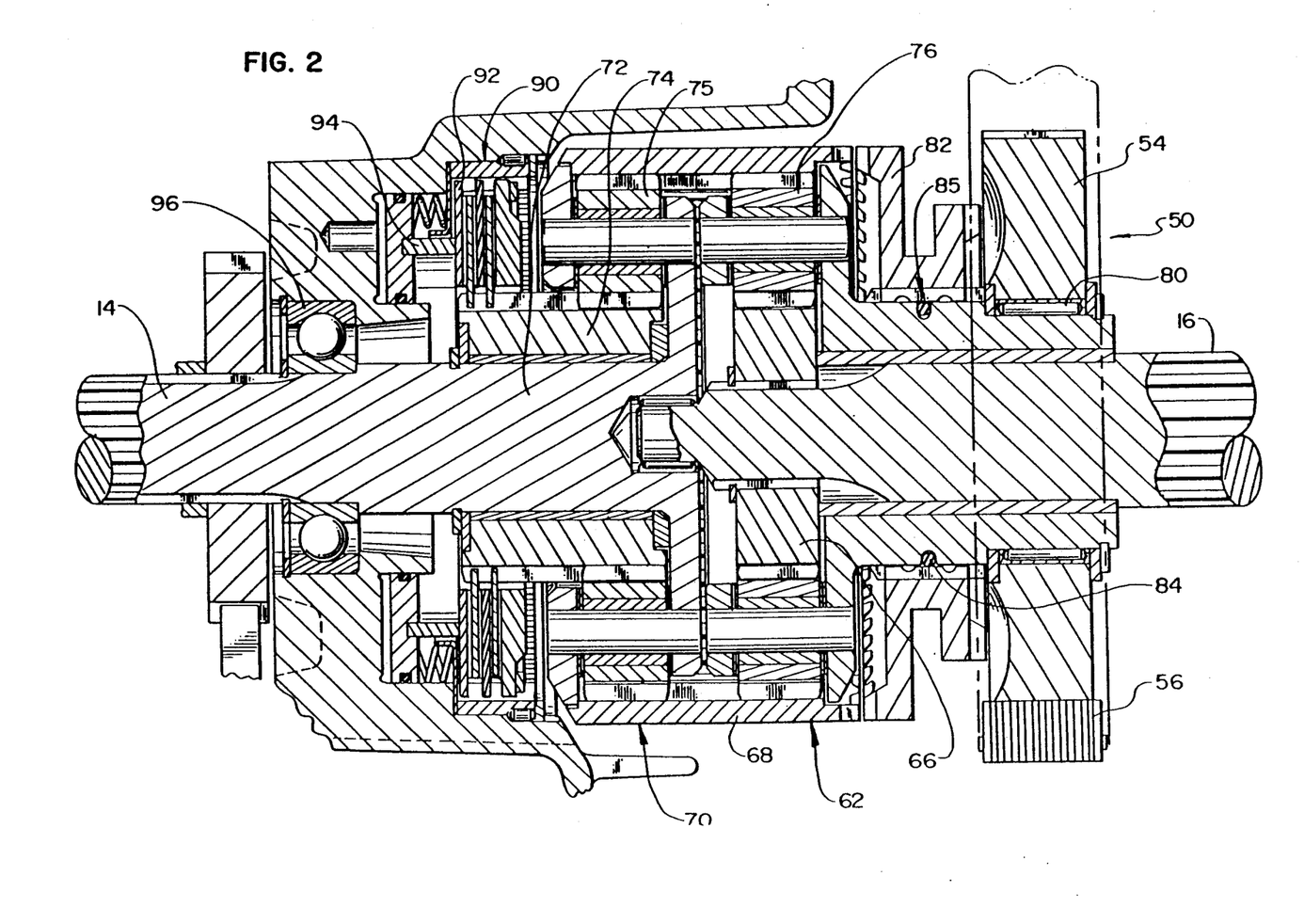
FIG. 2 is a detailed view of a portion of FIG. 1.
Figure 3:
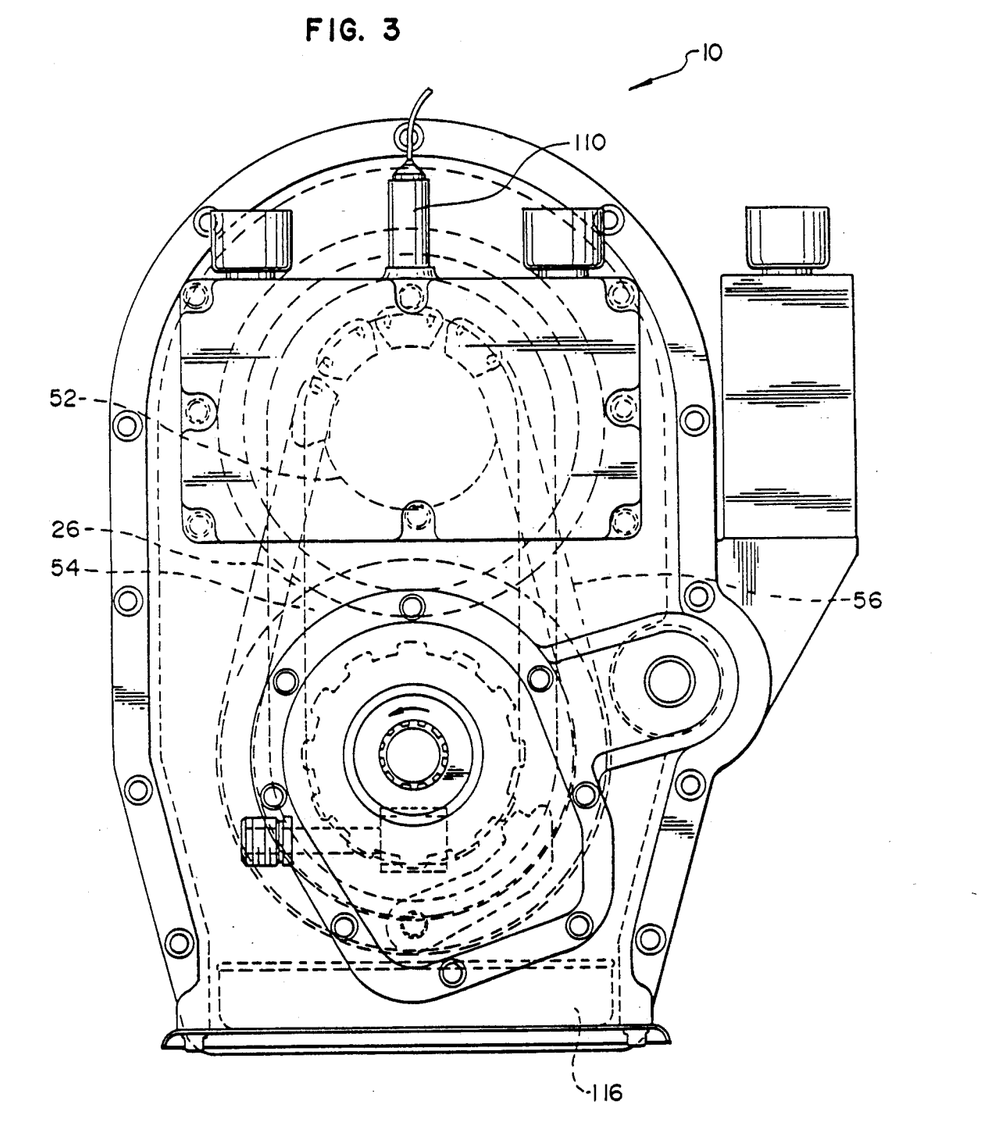
FIG. 3 is an end view of the transmission of FIG. 1, illustrating the locations of the internal components.

Turning now to the drawings, FIG. 1 shows an infinitely variable transmission generally at 10. A more detailed view of a portion of the transmission is shown in FIG. 2 and an end view of the transmission is shown in FIG. 3. The transmission includes an input shaft 12, which is capable of receiving a torque input from a power source, such as an engine, and an output shaft 14, which is capable of transmitting a torque output to a drive line or the like. An intermediate shaft 16 is located beneath the input shaft 12 and parallel thereto. The intermediate shaft 16 is preferably positioned directly in a line with the output shaft 14.

Two power paths are provided to transmit torque from the input shaft 12 to an output. One power path comprises a continuously variable speed mechanism, shown generally at 20, which transmits torque from the input shaft 12 to the intermediate shaft 16. The continuously variable speed mechanism preferably includes a first variable pulley 22 on the input shaft 12 and a second variable pulley 24 on the intermediate shaft 16. Each pulley is continuously variable between a maximum pitch radius R and a minimum pitch radius r. The ratio of R/r is predetermined to exceed the ratio of the other power path by a few percent. A suitable belt 26 or the like couples pulleys 22 and 24. Examples of suitable belts are disclosed in U.S. Pat. No. 4,313,730, issued Feb. 2, 1982, and U.S. Pat. No. 4,507,106, issued Mar. 26, 1985. A wide variety of belts, such as Van Doorne belts, may be used in a continuously variable speed mechanism of this type. Other suitable belts may use either flexible or articulated tensile members that provide suitable resistance to elongation combined with transverse members that provide good resistance to lateral compression with a low ratio of weight to tensile strength.

Pulley 22 includes a fixed flange 27 and a slidable flange 28 having a hub 29 rotatable with and slidable relative to the shaft 12. The hub 29 may be splined along the shaft. As the slidable flange 28 moves from its distal position to its proximal position relative to the fixed flange 27, the pulley 22 moves from its minimum pitch radius r to its maximum pitch radius R.

Pulley 24 is similar to pulley 22, and may be formed from virtually identical parts. Pulley 24 includes a fixed flange 31 rotatable with shaft 16 and a slidable flange 32 having a hub 33 rotatable with and slidable relative to shaft 16. As the slidable flange 32 moves from its distal position to its proximal position relative to the fixed flange 31, the pulley 24 moves from its minimum pitch radius r to its maximum pitch radius R.

When flange 28 is in its distal position and flange 32 is in its proximal position, the torque ratio through the continuously variable speed mechanism 20, from shaft 12 to shaft 16, is R/r. When the flange 28 is in its proximal position and flange 32 is in its distal position, the torque ratio through the continuously variable speed mechanism 20, from shaft 12 to shaft 16, is r/R.

Suitable means is provided for directing fluid to and from chambers 36 and 38 in order to slide flanges 28 and 32, respectively, and thus to vary the pitch radii of pulleys 22 and 24 between their predetermined minimum and maximum limits. Springs 42 and 44 help direct the sliding movement of the slidable flanges 28 and 32.

The other power path from the input to an output includes a fixed ratio drive, shown generally at 50, which transmits torque from the input shaft 12. The fixed ratio drive 50 includes a first sprocket 52 and a second sprocket 54. The sprockets 52 and 54 are drivingly connected by a chain 56, which is preferably of the silent chain type. Examples of suitable silent chain include U.S. Pat. No. 4,342,560, issued Aug. 3, 1982, and U.S. Pat. No. 4,010,656, issued Mar. 8, 1977. A wide variety of chain may be used in a fixed ratio speed device of this type, including roller chain as well as silent chain. Alternatively, an idler gear assembly may be utilized to provide a fixed ratio drive.

The intermediate shaft 16 is supported by a pair of tapered roller bearings 57a, 57b, within the transmission housing 60. Similarly, the input shaft 12 is supported by a pair of tapered roller bearings 58a, 58b.

At the second end of the intermediate shaft 16 is a first planetary gearset or differential planetary, shown generally at 62. The first planetary gearset 62 has a first portion or planetary carrier portion 64, a second portion or sun portion 66, and a third portion or ring portion 68. In the preferred embodiment, the sun portion has 36 teeth while the ring portion has 66 teeth. A second planetary gearset 70, or speed reduction planetary, is provided adjacent the first planetary gearset 62. The second planetary gearset 70 likewise has a first portion or planetary carrier portion 72, a second portion or sun portion 74, and a third portion or ring portion 68. The ring portion of the second planetary gearset 70 is preferably formed of the ring portion of the first planetary set 62, and is therefore given an identical number 68. Each planetary gearset contains the conventional reaction members and gearing teeth, including the planet gears 75, 76.

The first planetary gearset 62 is supported by the intermediate shaft 16. The second planetary gearset 70 is supported by output shaft 14.

The first sprocket 52 of the fixed ratio drive has t teeth and is secured to the input shaft 12. The first sprocket, in the preferred embodiment, has 26 teeth. The second sprocket 54, with T teeth, is connected about the periphery of the planetary carrier portion 64 of the first planetary gearset 62. The second sprocket is supported by the planetary carrier 64 by bearing 80, or the like, which allows the sprocket 54 to freewheel around the planetary carrier portion 64. The second sprocket 54, in the preferred embodiment, has 47 teeth.

A jaw clutch 82, or dog clutch, is slidably connected by a spline about the hub of the planetary carrier 64, between the second sprocket 54 and the ring portion 68. A detent ring 84, disposed between the clutch 82 and the planetary carrier 64, causes the clutch to be in a position engaging the ring portion 68 or in a position engaging the sprocket 54. The length of the dog clutch member 82 is slightly less than the space between sprocket 54 and ring gear 68 to avoid any overlap in engagement. The shape of the detent grooves 85 in the hub of member 82 is designed to bias this member away from its mid-position into one of the two engagement positions. By shifting the jaw clutch between these positions, either the sprocket 54 is drivingly connected to the planetary carrier 64 or the ring portion 68 is locked or connected to the planetary carrier 64. Alternatively, two friction clutches may be used to provide engagement.

The detent means 85, with the detent ring 84, provides a spring-actuated toggle device with two distinct equilibrium positions. The equilibrium positions are mutually exclusive and the neutral position will be unstable, that is, the jaw clutch 82 will not be in both positions simultaneously.

The sun portion 74 of the second planetary gearset 70, which has 38 teeth in its preferred form, is disposed about the periphery of the planetary carrier portion 72, or output shaft. A bearing 86 allows rotation of the shaft 16 within the planetary carrier 72. A bearing 88 is interposed between the sun 74 and the planetary carrier 72 to allow rotation of the sun about the planetary carrier. The sun portion 74 is operatively connected to a second clutch 90 of the disc plate type. Alternatively, other means such as a band and drum can be used for the same purpose. The clutch 90 includes plates 92 and an actuation member 94. The clutch 90 allows a grounding of the sun 74 to the transmission housing 60. Actuation of the clutch through member 94 locks the plates 92 and thereby locks the sun 74 to the housing 60. When the clutch 90 is disengaged, the sun 74 is allowed to spin freely.

The output shaft 14 is supported by bearing 86 and ball bearing 96, which are located adjacent the parking gear 98 and the speed gear 99. The parking gear 98 locks the output shaft when connected to hinged pawl 101. The speedo gear is a conventional pickup for a speedometer. A fluid seal 102 is provided at the output shaft 14. A similar fluid seal 104 is provided at the input shaft 12. The input shaft 12 is supported by a pair of bearings 58a, 58b. A fluid pump 106 is provided along the input shaft, near the location of the first sprocket 52. The fluid pump 106 provides the necessary hydraulic pressure for the control system.

The transmission housing 60 includes a number of components which assist the actuation of the transmission. A control housing 108 is located at the end of the input shaft 12. The control system will be described in more detail below. A pair of speed sensors 110, 112 are provided and operatively connected to the input shaft 12 and the intermediate shaft 16, respectively. The lower portion of the housing 60 includes a fluid drain passage 114 and filter 116, as well as a windage tray 118. Additional structural support for the transmission and control components is also provided.

Figure 4:
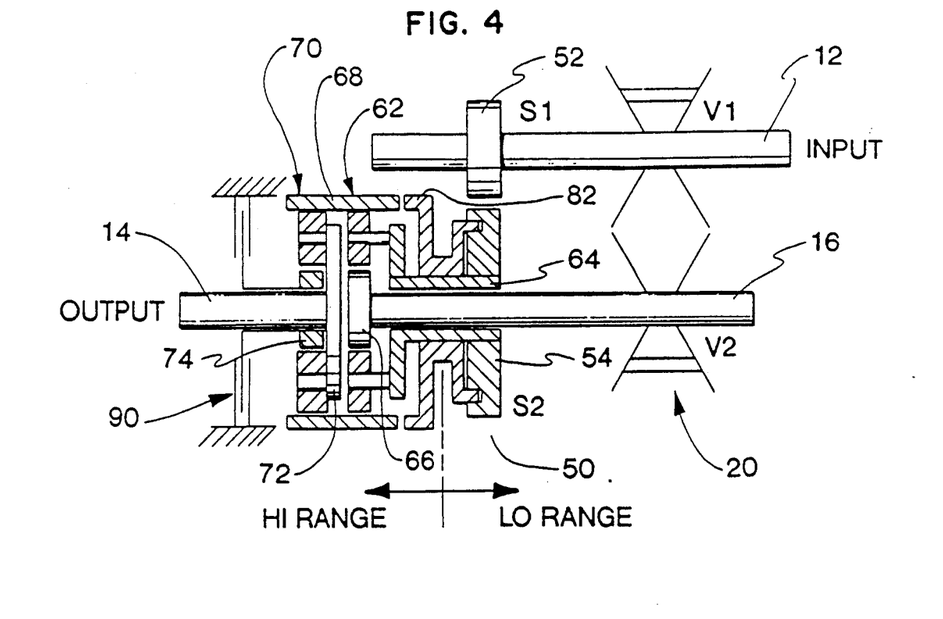
FIG. 4 is a schematic of the infinitely variable transmission illustrating the two power paths and the pair of planetary gearsets.
Figure 5:
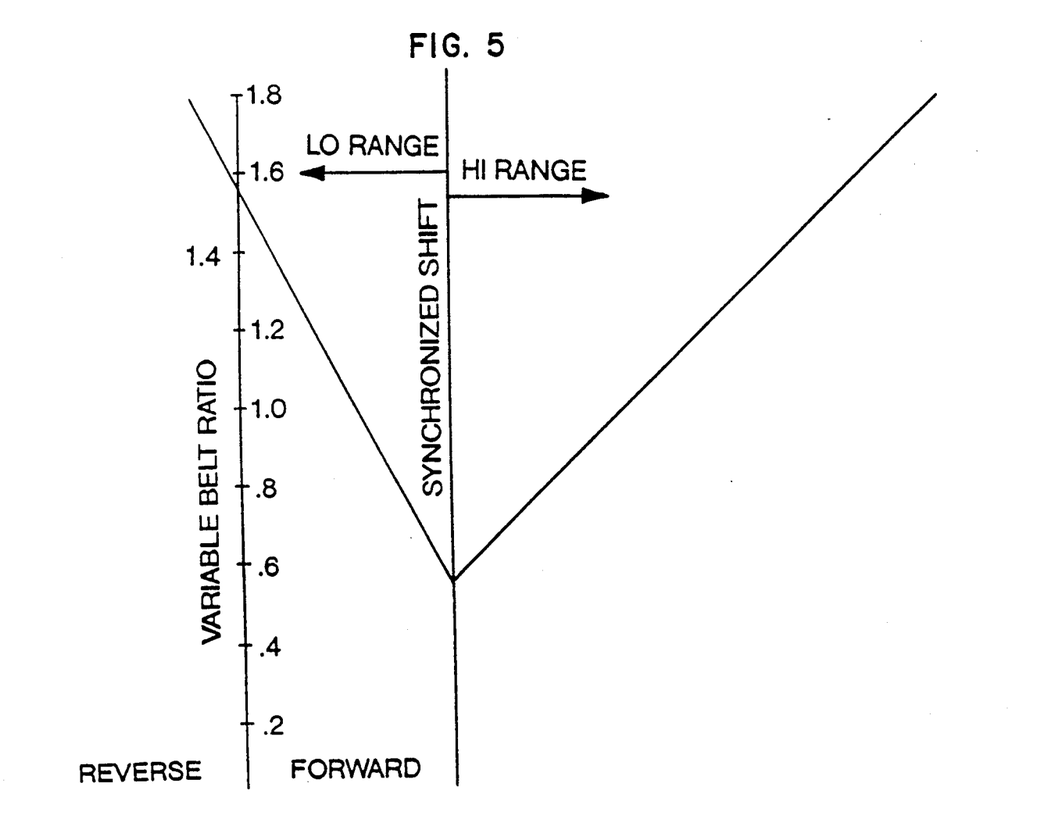
FIG. 5 is a graph of the relationship of the overall I.V.T. speed ratio plotted against the variable belt ratio.

A schematic of the operation of the infinitely variable transmission is shown in FIG. 4. The relationship between the variable belt speed ratio and the overall transmission ratio is shown in FIG. 5. As shown in FIG. 4, the first planetary gearset 62, or differential planetary gearset, has the ring gear 68 connected to the output. The planet carrier 64 is always driven in the same direction as the input shaft 12; in low range, by means of fixed ratio drive 50; in high range, by means of the lock to the ring gear 68. The sun 66 is driven in the same direction as the input shaft by the continuously variable speed mechanism 20. The relative speeds of the sun 66 and carrier 64 in low range can result in the ring 68 turning in the opposite direction of input shaft 12, resulting in reverse gear.

In the preferred embodiment, at the forward speed ratio of 0.55, or 26/47, all elements in the first planetary gearset 62, that is, the sun 66, the planet carrier 64 and the ring 68, are rotating at the same speed and the jaw clutch 82 may be shifted from the low range to the high range, and vice versa. The shift to the high range is achieved by disconnecting the planet carrier 64 from the second sprocket 54 in the fixed ratio drive 50 and connecting the planet carrier 64 to the ring 68. This action locks the planet carrier 64 to the ring 68 and, at the same time, removes the fixed ratio chain drive 50 from the power flow. In the high range, the transmission operates as a straight, continuously variable transmission with speed ratios from 0.55 to 1.81.

As shown in FIG. 5, starting in forward and reverse is accomplished in the preferred embodiment simply by changing the belt ratio below and above 1.57 while the transmission is in the low range, that is, while the jaw clutch 82 is connected to the fixed ratio drive 50. No separate slipping of a clutch is required to move from reverse to forward.

In the preferred embodiment, the final reduction ratio is 6.49. The final reduction is achieved by a 1.58 reduction at the second planetary gearset 70, or reduction planetary gearset, and a 4.11 rear axle ratio (not shown), which can be accomplished by a differential mechanism. As shown in FIG. 4, the reduction planetary gearset shares the ring gear 68 with the ring gear of the differential planetary. The planet carrier 72 is connected to, or forms a part of output shaft 14. The sun gear 74 is connected to ground, or the transmission housing 60, by the multiple plate clutch 90.

As shown in FIG. 5, in the preferred embodiment, when the variable belt ratio is 1.57 and the transmission is in the low range, the ring gear 68 of the differential planetary stops rotating and the vehicle is stationary. All of the power from the input shaft circulates between the fixed ratio drive 50 and the continuously variable speed mechanism 20, and there is zero output power. With slight discrepancies in the belt speed ratio above and below 1.57, the vehicle can creep forward or backward. This creep is slow, but very powerful and limited only by wheel slip. To prevent this vehicle creep, a positive disconnect is provided in the form of the multiple plate or disc clutch 90. When the control lever is in the neutral position, the clutch 90 is fully released and the sun 74 spins freely.

The clutch 90 serves another important purpose as an overload protection device In addition to overload protection and true neutral capabilities, the clutch 90 includes the capabilities to slip at predescribed and controlled torque levels. The clutch acts to slip and thus provide a small amount of torque near neutral (to eliminate backlash) and limits circulating power in the transmission to prevent belt or chain tensile overload.

To operate the transmission in the low range, the jaw clutch 82 is shifted to the right, as shown in FIGS. 1, 2 and 4, which connects the sprocket 54 of the fixed ratio drive 50 to the planetary carrier 64 of the first planetary gearset 62. In this mode of operation, the power flows through two paths. The first path is through the fixed ratio drive 50 and then the planetary carrier 64. The second path is through the continuously variable speed mechanism 20 and then through the sun 66. In the preferred embodiment, the transmission operates in the low range between a 0.55 speed ratio (forward) and a −0.13 speed ratio (reverse), with split power as a result of the first differential planetary gearset. At variable belt ratios between 1.57 and 1.81, the transmission operates in reverse with overall transmission speed ratios from 0 to −0.13. At variable belt ratios from 1.57 to 0.55, the transmission operates in forward with overall transmission speed ratios from 0 to 0.55.

Figure 6:
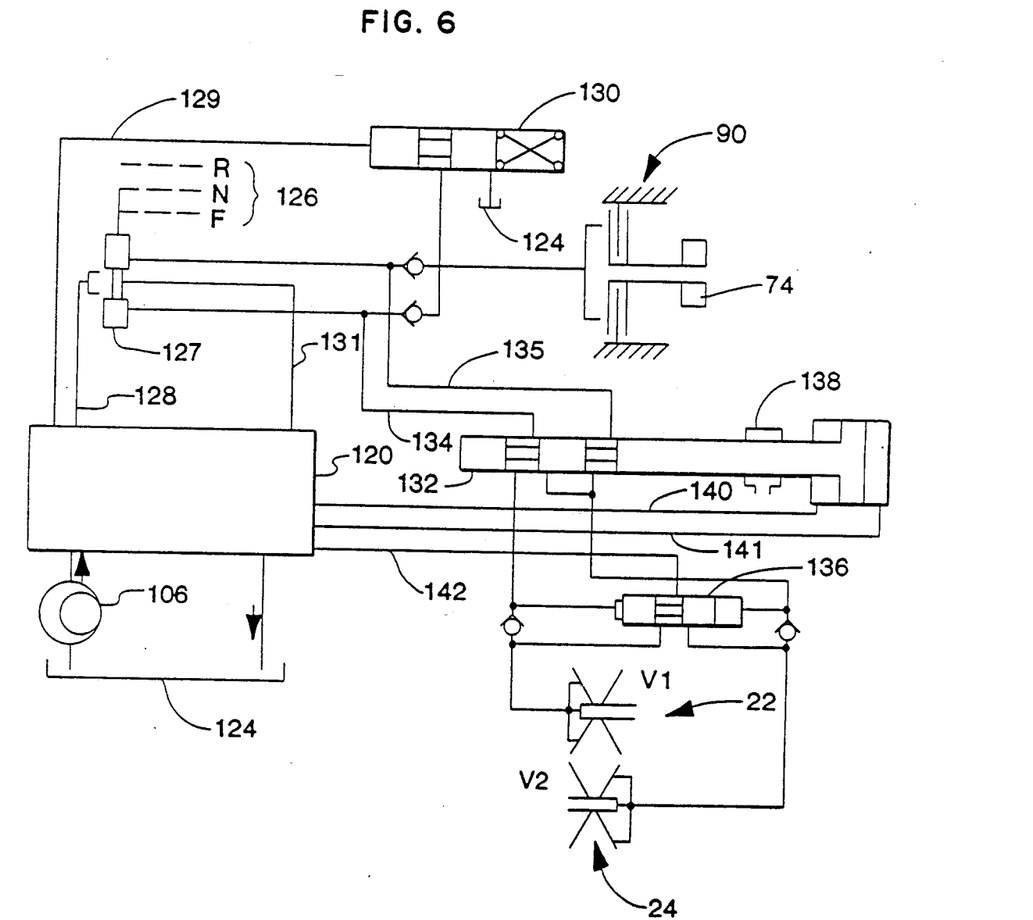
FIG. 6 is a schematic of the control system for the infinitely variable transmission.
Figure 7:
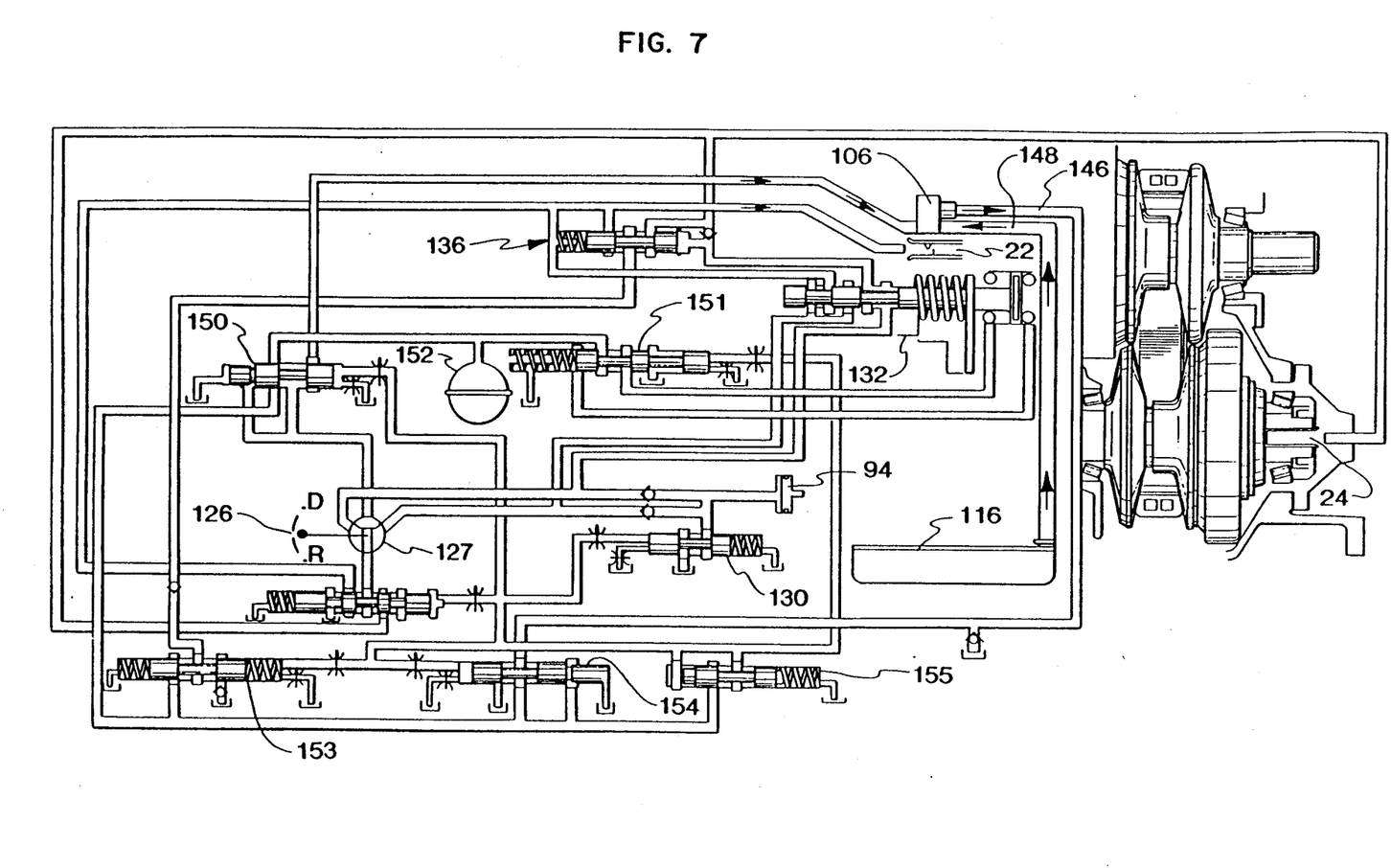
FIG. 7 is a piping diagram for the control system.

In the low range operation, the driver selects forward "D" or reverse "R", from the selector shown on the control schematics of FIGS. 6 and 7. Movement from the neutral position causes the clutch 90 to be lightly applied to allow a small amount of torque to be delivered to the drive train to take up the gear backlash, but not enough to move the vehicle. This avoids vehicle creep and provides a smooth vehicle launch upon accelerator actuation without a driveline clunk due to backlash. The variable belt is then moved slightly away from the zero output (1.57 ratio) to a slightly forward or slightly reverse ratio. The small ratio along with the lightly applied clutch is necessary to takeup backlash in the driveline. At this point, vehicle operation continues with the selector in the "D" position for any forward driving situation. The controls and accelerator position will select engine r.p.m. and the transmission ratio for the desired operation of the vehicle.

To operate the transmission in the high range, a synchronous shift is made at the forward speed ratio of 0.55, at which all elements of the first planetary gearset are rotating at the same speed, by sliding the jaw clutch 82 to the left, as shown in FIGS. 1, 2 and 4. This movement releases the driving connection between the sprocket 54 and the planet carrier 64 and locks the planet carrier 64 to the ring gear 68. The fixed ratio drive 50 and the first planetary gearset 62 are now inoperative and the total power flow is through the continuously variable speed mechanism. The overall transmission speed ratio is therefore equal to the variable belt ratio and is continuously variable from 0.55 to 1.81 in the high range.

The control system schematic is shown in FIG. 6, while the control piping diagram is shown in FIG. 7. The control of the transmission involves control of the torque or load pressure to the pulleys of the continuously variable speed mechanism 20, in order to ensure that the belt 26 will not slip. The control of the transmission also involves control of the flow into or out of the ratio control chambers 36, 38 in order to select the most optimum ratio relative to the engine performance economy map supplied by the designer of the particular engine chosen for use with the transmission.

Each of the variable pulleys 22 and 24 is utilized as either the driver pulley or the driven pulley depending on the following transmission conditions. In the high range, which allows only forward motion, the pulley 22 is the driver pulley on the input shaft 12, and the pulley 24 is the driven pulley on the intermediate shaft 16. Overall speed ratios range between 0.55 and 1.81 in this mode. In the low range, during forward motion, pulley 24 on the intermediate shaft is the driver pulley and pulley 22 on the input shaft is the driven pulley. Overall speed ratios range between 0.55 and 1.57 in this mode. In the low range, during reverse motion, pulley 22 on the input shaft is the driver pulley and pulley 24 on the intermediate shaft is the driven pulley. Overall speed ratios range between 1.57 and 1.81 in this mode.

In that the pulleys change their function depending on the mode of transmission operation, the control system acts to supply torque pressure to the driven pulley and ratio fluid control to the driver pulley on the basis of this schedule of driver/driven pulleys. The complete control system is configured to generate the proper ratio flow and torque pressure relative to the engine economy and performance map, which is dependent on the engine chosen for use with the infinitely variable transmission.

As shown in the schematic of FIG. 6, an electronic/hydraulic control box 120 provides several outputs on the basis of electronic signal inputs. The control box 120 receives signal information of input (engine) speed, output (vehicle) speed, accelerator position and selector control position (forward, reverse, neutral, park). The control box also receives information of the speed of the input, intermediate and output shafts. The electronic control calculates whether to increase or decrease the ratio fluid control and torque pressure control and sends the appropriate signals to the variable pulleys 22 and 24 to achieve the optimum points on the engine performance and economy map, which is based on the chosen engine. The electronic/hydraulic control box 120 also sets the variable belt ratio at 1.57, to reduce hysteresis and eliminate hunting, when the selector lever 126 is in the neutral position. The electronic/hydraulic control box 120 further sends the appropriate signals to effectuate a range upshift or a range downshift.

A pump 106 supplies fluid from sump 124 to send the regulated torque pressure to the selector valve 127. The selector lever 126 is operatively connected to the selector valve 127 which controls the regulated torque pressure by line 128. When the selector lever 126 is in neutral, the multiple plate clutch 90, or neutral and overload clutch, is disengaged and the sun 74 on the planetary reduction rotates freely. The clutch control signal is sent through line 129 to the clutch control valve 130. The electronic/hydraulic control box 120 sends a signal to maintain the variable pulley ratio at 1.57 through line 131.

The forward signal is sent to a range valve 132 through line 134. The reverse signal is sent to the range valve 132 through line 135. When the control lever 126 is placed in either forward or reverse, the neutral/overload clutch is lightly engaged and the regulated torque pressure is routed through the range valve 132 to the variable pulleys 22 and 24, which are designated in the schematic as V1 and V2, respectively. During the passage to the variable pulleys 22, 24, the torque pressure directs a diverter valve 136 into the proper position so that the ratio control fluid is directed to the opposite pulley of the torque pressure fluid.

When the vehicle is accelerating in the forward direction and the overall speed ratio reaches 0.55, a range fork 138 moves to the left putting the transmission in the high range. This directs the torque pressure fluid to the second pulley 24 and the ratio control fluid to the first pulley 22. The low range signal and high range signal are sent from the electronic/hydraulic control box 120 by lines 140 and 141, respectively. The pulley ratio signal is sent from the electronic/hydraulic control box 120 by way of line 142.

The piping diagram of FIG. 7 shows the preferred embodiment of the implementation of the control system. The diagram shows the selector valve 127 operatively connected to the clutch control valve 130. Both the selector valve 127 and clutch control valve 130 are operatively connected to the clutch apply piston 94. The selector valve 127 is also piped to a range valve 132 and a diverter valve 136. Each of these valves is preferably in the form of a conventional spool valve. The selector valve 127 is also piped to a secondary pressure valve 150, which is connected to a range pilot valve 151 with an accumulator 152 therebetween. The secondary pressure valve 150 and diverter 136 are each piped to a ratio flow valve 153, which is piped to a pump pressure valve 154 and a pilot pressure valve 155. Pressure for flow is provided by pump 106, which includes pressure line 146 and suction line 148. Through this control system, fluid is supplied to variable pulley 22, or V1, and variable pulley 24, or V2.

The valves of the control system are in the following positions for each the described transmission conditions:

| Valve Name | Reverse | Forward-Low | Neutral | Forward-High |
| --- | --- | --- | --- | --- |
| Rotary Selector | L | R | M | R |
| Ratio Neutral | R | R | C | R |
| Clutch Control | C | C | L | C |
| Diverter | L | R | M | L |
| Range Pilot | R | R | R | L |
| Range | R | R | R | L |
| Pump Pressure | C | C | C | C |
| Pilot Pressure | C | C | C | C |
| Secondary Press. | C | C | C | C |
| Ratio Flow | C | C | N | C |

The designations in the table are detailed as follows:
L—left or counter-clockwise
R—right or clockwise
M—middle
C—control
N—not applicable The infinitely variable transmission, including the control system, can be matched with engines of varying sizes and performance characteristics. The preferred embodiment of this transmission was developed for use with a single-shaft, ceramic, gas-turbine powered passenger car, with a reduction gear. The infinitely variable transmission of the present invention is capable of operating continuously at input speeds in the 4500 to 6000 r.p.m. range necessary to utilize the best characteristics of a single shaft turbine engine having a fixed ratio output gear speed reduction.

Figure 8:
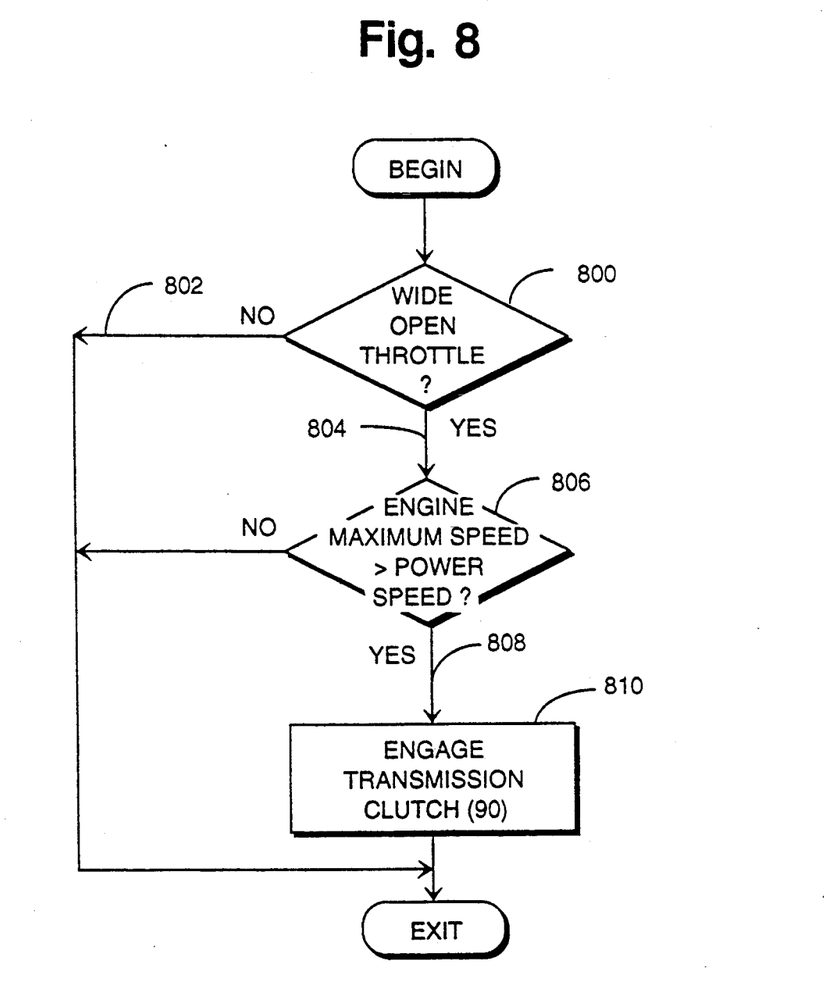
FIG. 8 is a flow diagram for the control strategy of accelerating the engine to a maximum speed, then engaging the transmission output clutch to accelerate the vehicle.

FIG. 8 consists of a flow chart describing a control strategy for accelerating a vehicle with the dual range IVT after first bringing the engine speed up to a maximum power output point. This control loop is executed periodically by the electronic control box 120 and is preferably invoked by a timed interrupt to the normal execution of other control operations executed by the electronic control box 120 in FIG. 6. The engine is assumed to be on and running. When the interrupt occurs and control passes to decision box 800, the electronic control box 120 tests whether wide open throttle conditions exist. Typically this condition exists when the driver completely depresses the accelerator pedal. If wide open throttle conditions do not exist, then control passes on line 802 and the interrupt routine is exited and this acceleration strategy is by-passed.

If, however, wide open throttle conditions exist, then control passes on line 804 to decision box 806. It is assumed at this point that the output clutch coupling the input shaft 12 to the output shaft 14 is substantially disengaged such that the power delivered by the pistons in the engine to the input shaft 12 is used almost entirely to increase the rotational velocity of the rotating parts of the engine and drive train described heretofore. The electronic control box 120 determines the engine speed by measuring the rotational speed of input shaft 12. If the engine speed is less than the maximum power output speed, then control passes on line 802 and the interrupt routine is exited. If the engine speed has reached or exceeds the maximum power speed, then control passes on line 808 to operation box 810. At this point the electronic control box 120 transmits appropriate control signals to engage the coupling clutch 90 to a sufficient degree to accelerate the vehicle while maintaining essentially a constant engine speed. At this point in time almost all of the engines power is allocated to increasing the vehicle's velocity. The remaining power is used to maintain the engine's current velocity. Control then passes on line 802 and the interrupt routine is exited.

Figure 9:
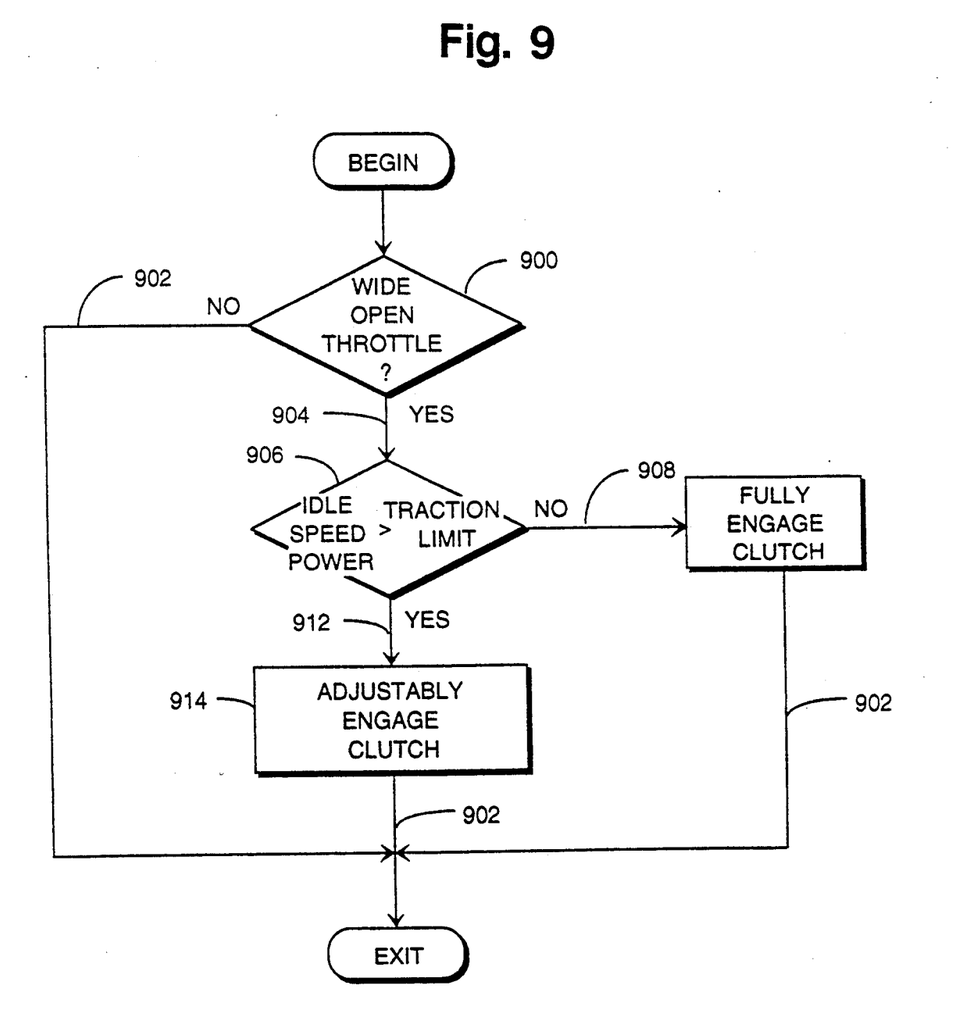
FIG. 9 is a flow diagram for the control strategy of accelerating the engine and vehicle simultaneously; and, FIG. 10 is a flow diagram for the control strategy of accelerating the engine, then engaging the transmission output clutch to accelerate the vehicle and modifying the variable component ratio in order to transfer energy from the decelerating engine to the transmission output.

The above description of an acceleration strategy for a vehicle containing an IVT is most valuable to the extent that the output torque does not exceed the traction capabilities of the vehicle. If, however, the output torque on shaft 12 exceeds the traction of the vehicle or if for some other reason it is not desirable to wait for the engine to accelerate to maximum power speed before engaging the coupling clutch 90, the acceleration strategy described in FIG. 9 is a desirable alternative. Generally, in response to a driver's demand for power, the engine's output power is shared between accelerating the vehicle to the maximum degree possible without losing tire traction and accelerating the engine. More specifically, in response to the generation of a programmed interrupt, electronic control box 120 executes the control loop illustrated in FIG. 9. At decision box 900, the electronic control box 120 tests whether wide open throttle conditions exist. If wide open throttle conditions do not exist, then control passes on line 902 and the interrupt routine is exited and this control strategy is by-passed. If wide open throttle conditions exist, then control passes on line 904 to decision box 906.

If the power produced by the engine does not exceed the traction of the vehicle, then control passes on line 908 to operation box 910. The coupling clutch 90 is fully engaged and the engine speed and vehicle speed simultaneously increase. Control then passes on line 902 and the interrupt routine is exited. If, however, the power produced by the engine causes the input torque on shaft 12 to exceed the traction of the vehicle, then control passes on line 912 to operation box 914.

At operation box 914 the electronic control box 120 transmits appropriate signals to engage the clutch to the extent that the torque transmitted to the output shaft 14 through the coupling clutch 90 does not exceed the traction limits of the vehicle. At this point in time, the wheels are driven by a maximum torque receivable without losing traction, while the engine receives the remaining power in order to accelerate to a higher power point. Control then passes on line 902 and the interrupt routine is exited.

Figure 10:
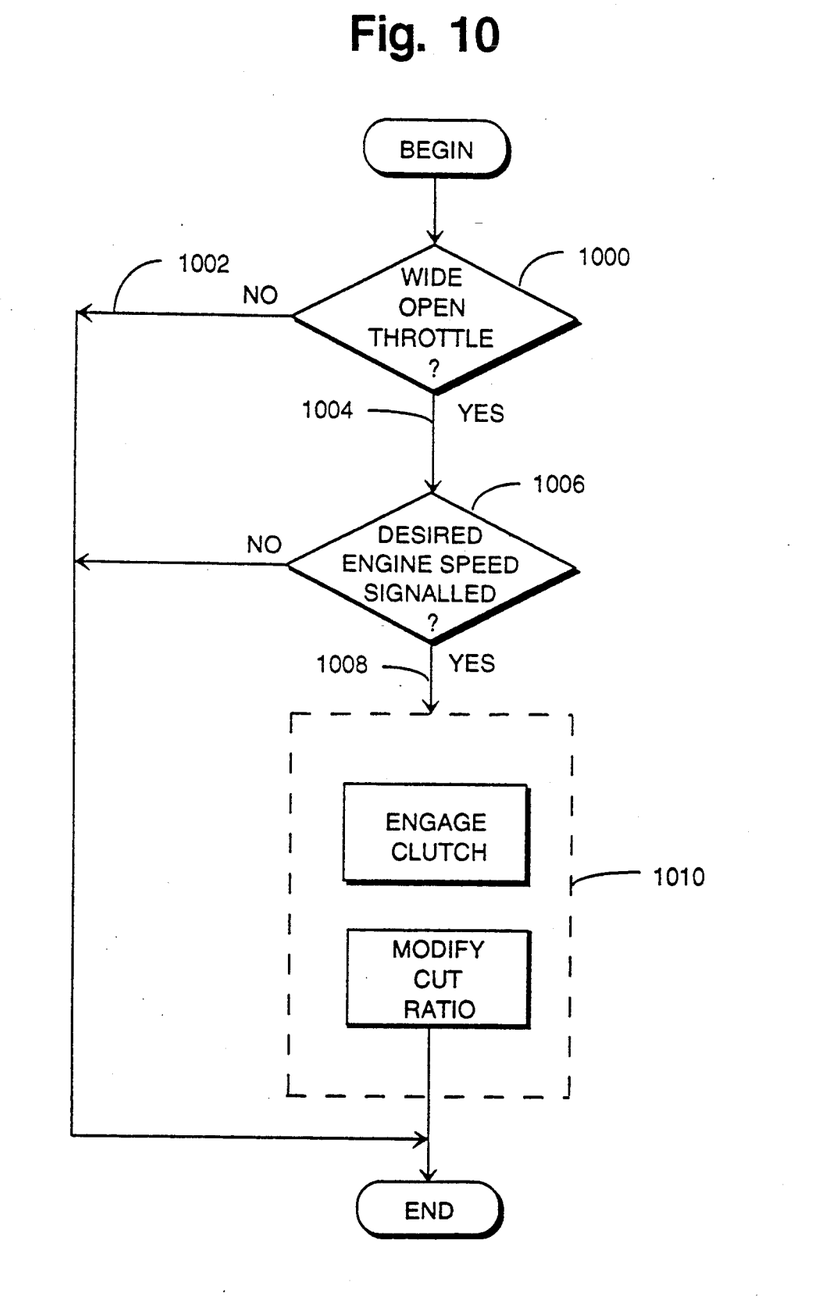

The final clutch control strategy for accelerating a vehicle containing an IVT is illustrated in FIG. 10. When the control loop begins at decision box 1000, it is assumed that an appropriate signal has been relayed to the electronic control box 120 that indicates that the coupling clutch 90 should be disengaged. This signal is generated in the preferred embodiment when a vehicle operator depresses the accelerator while holding the brake pedal down. At decision box 1000, the electronic control box 120 tests whether wide open throttle conditions exist. If wide open throttle conditions do not exist, then control passes on line 1002 and the interrupt routine is exited. If wide open throttle conditions exist, then control passes on line 1004 to decision box 1006.

At decision box 1006, the electronic control box 120 tests whether the operator has signalled that the desired engine speed for engaging the clutch has been attained. In the preferred embodiment this occurs when the operator releases the brake pedal while simultaneously holding the accelerator down. If the desired engine speed has not yet been attained, then control passes on line 1002 and the interrupt routine is exited. Thus, the driver is given a choice of whether to immediately accelerate the vehicle, or to wait a desired period of time for the engine to "spool up" to a high power point when wide open throttle is engaged.

If the operator has signalled that the desired engine speed has been attained, then control passes on line 1008 to operation box 1010, and the coupling clutch 90 is engaged. In addition, the continuously variable transmission ratio is increased sufficiently to decelerate the engine. The kinetic energy from the decelerating engine, transferred to the output shaft 14 through the coupling clutch 90, boosts the acceleration rate of the vehicle. One should note that the maximum engine speed in the strategy illustrated in FIG. 10 may actually exceed the maximum power velocity when maximum acceleration is desired since the deceleration of the engine in itself provides additional torque for accelerating the vehicle. After the clutch has been engaged and the CVT pulleys adjusted, control passes on line 1002 and the interrupt routine is exited.

It should be noted that no consideration is given to the traction of the wheels in executing the third strategy. Thus, it is up to the vehicle operator to control the torque delivered to the wheels in order to prevent the loss of traction. Ideally, this strategy would be used in a vehicle whose traction met or exceeded the maximum torque deliverable from the engine.

While specific embodiments of the current invention are illustrated, it will be understood, of course, that the invention is not limited to this embodiment. Those skilled in the art to which the invention pertains may make modifications and other embodiments employing the principles of this invention, particularly upon considering the foregoing teachings.

What is claimed is:

1. A method for adjustably controlling a coupling means for transmitting power from an engine rotationally driving a torque input source to a torque output for accelerating a vehicle containing a continuously variable transmission comprising the following steps:
    ascertaining the power available from said torque input source;
    adjustably coupling said available power through a continuously variable transmission to said torque output for accelarating said vehicle in order to accelerate said vehicle and said engine at desired rates;
    substantially disengaging said coupling means and accelerating said input torque source until the rotational velocity of said input torque source substantially reaches a peak power velocity; then
    substantially engaging said coupling means for transmitting power from said torque input source through said continuously variable transmission to said torque output in order to accelerate said vehicle.

2. The coupling strategy of claim 1 further comprising the following steps:
    said input source is maintained at an idle rotational velocity sufficient to produce an input torque exceeding the wheel traction of said vehicle;
    said coupling means is adjustably engaged such that the portion of the torque from said input torque source transmitted to said torque output substantially meets, but does not exceed the wheel traction of said vehicle; and
    using the excess power received by said input torque source to increase the rotational velocity of said input torque source.

3. A method for adjustably controlling a coupling means for transmitting power from an engine rotationally driving a torque input source to a torque output for accelerating a vehicle containing a continuously variable transmission comprising the following steps:
    ascertaining the power available from said torque input source;
    adjustably coupling said available power through a continuously variable transmission to said torque output for accelerating said vehicle in order to accelerate said vehicle and said engine at desired rates;
    receiving a disengagement signal;
    substantially completely disengaging said coupling means and accelerating the rotational velocity of said input torque source;
    receiving an engagement signal when a desired engine speed has been reached;
    engaging said coupling means; and,
    increasing the ratio of said continuously variable transmission in order to accelerate the engine while accelerating said vehicle.

4. The method of claim 3 wherein said coupling means is substantially disengaged in response to the activation of a wheel brake mechanism by the operator of said vehicle while the accelerator is depressed.

5. The method of claim 4 wherein said engagement signal is generated in response to the deactivation of said wheel brake mechanism.

* * * * *